(12) United States Patent
Lee

(10) Patent No.: US 9,924,488 B2
(45) Date of Patent: Mar. 20, 2018

(54) POSITION AUTHENTICATION

(71) Applicant: INDUSTRY-ACADEMIC COOPERATION FOUNDATION, KOREA NATIONAL UNIVERSITY OF TRANSPORTATION, Chungbuk (KR)

(72) Inventor: Jonghyup Lee, Chungju-si (KR)

(73) Assignee: INDUSTRY-ACADEMIC COOPERATION FOUNDATION, KOREA NATIONAL UNIVERSITY OF TRANSPORTATION, Chungbuk (KR)

( * ) Notice: Subject to any disclaimer, the term of this patent is extended or adjusted under 35 U.S.C. 154(b) by 0 days.

(21) Appl. No.: 14/890,683

(22) PCT Filed: Apr. 15, 2014

(86) PCT No.: PCT/KR2014/003229
§ 371 (c)(1),
(2) Date: Nov. 12, 2015

(87) PCT Pub. No.: WO2015/160001
PCT Pub. Date: Oct. 22, 2015

(65) Prior Publication Data
US 2016/0095082 A1    Mar. 31, 2016

(51) Int. Cl.
*H04W 24/00*    (2009.01)
*H04W 64/00*    (2009.01)
(Continued)

(52) U.S. Cl.
CPC ......... *H04W 64/00* (2013.01); *H04L 63/0846* (2013.01); *H04W 4/02* (2013.01); *H04W 12/06* (2013.01)

(58) Field of Classification Search
CPC ...... H04W 12/06; H04W 4/025; H04L 63/08; H04M 2242/30; H04M 2242/14
(Continued)

(56) References Cited

U.S. PATENT DOCUMENTS 9,128,471 B1 * 9/2015 Shahid .................... G05B 1/01
2004/0203912 A1 10/2004 Budka et al.
(Continued)

FOREIGN PATENT DOCUMENTS

WO    2013060935 A1    5/2013

OTHER PUBLICATIONS

International Search Report and Written Opinion for International Application No. PCT/KR2014/003229, dated Jan. 12, 2015.
(Continued)

*Primary Examiner* — Timothy Pham
(74) *Attorney, Agent, or Firm* — Brundidge & Stanger, P.C.

(57) ABSTRACT

A method performed under control of an electronic device may include receiving at least one signal from at least one anchor point; calculating a location of the electronic device based at least in part on the at least one received signal; generating a position proof based at least in part on the at least one received signal; and in response to receiving a position proof request from a server, transmitting the position proof to the server, when the position proof corresponds to the position proof request.

20 Claims, 6 Drawing Sheets

(51) Int. Cl.
*H04W 4/02* (2018.01)
*H04W 12/06* (2009.01)
*H04L 29/06* (2006.01)

(58) Field of Classification Search
USPC ....................................................... 455/456.1
See application file for complete search history.

(56) References Cited

U.S. PATENT DOCUMENTS

| | | | |
|---|---|---|---|
| 2007/0200756 A1 | 8/2007 | Saito | |
| 2011/0109508 A1* | 5/2011 | Wolman | G01S 5/0205 |
| | | | 342/451 |
| 2012/0191512 A1* | 7/2012 | Wuoti | G06Q 30/0207 |
| | | | 705/14.1 |
| 2013/0042244 A1 | 2/2013 | Li et al. | |
| 2013/0251150 A1 | 9/2013 | Chassagne | |
| 2013/0288706 A1* | 10/2013 | Yu | H04W 4/02 |
| | | | 455/456.1 |
| 2013/0322630 A1 | 12/2013 | Wolman et al. | |
| 2015/0242602 A1* | 8/2015 | Skygebjerg | H04L 63/126 |
| | | | 726/7 |

OTHER PUBLICATIONS

Rasmussen, K. B., "Primitives for Secure Localization and Location Verification," ETH ZURICH, pp. 1-144 (2011).

Saroiu, S., and Wolman, A., "Enabling New Mobile Applications with Location Proofs," Proceedings of the 10th International Workshop on Mobile Computing Systems and Applications (HotMobile), pp. 1-6 (Feb. 23-24, 2009).

Smith, I. G., "The Internet of Things 2012 New Horizons," IERC European Research Cluster on the Internet of Things, 3rd edition of the Cluster Book, pp. 1-46 (2012).

Zhu, Z., and Cao, G., "APPLAUS: A Privacy-Preserving Location Proof Updating System for Location-based Services," Proceedings IEEE INFOCOM, pp. 1889-1897 (Apr. 10-15, 2011).

* cited by examiner

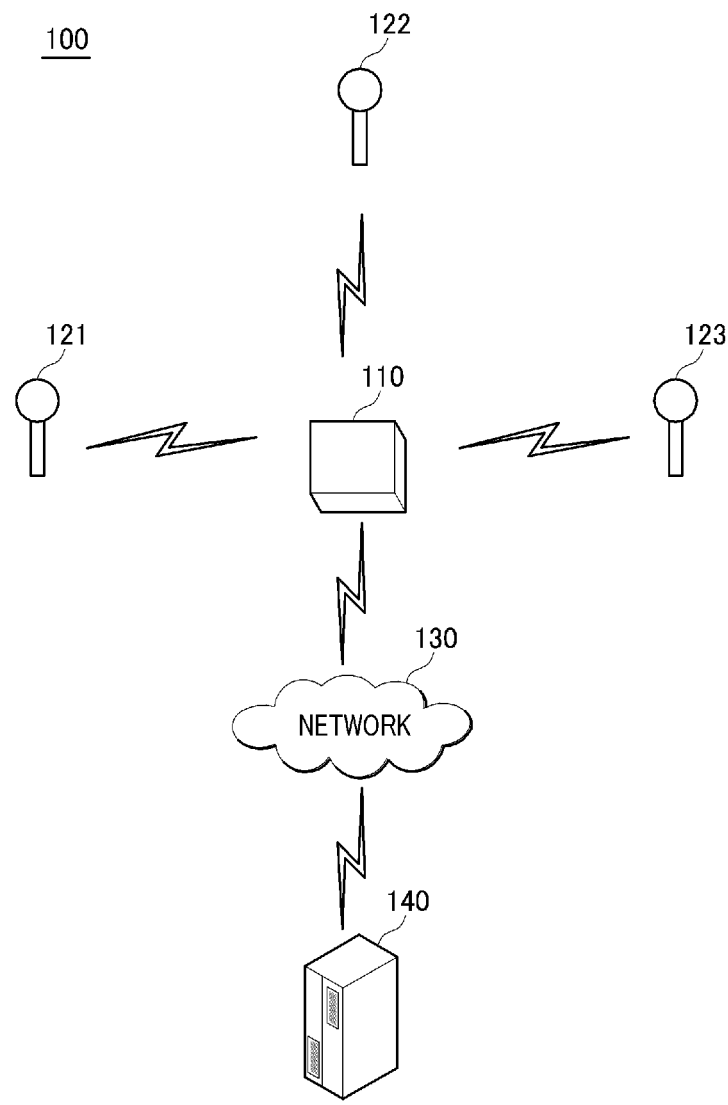
[Fig. 1]

[Fig. 2]
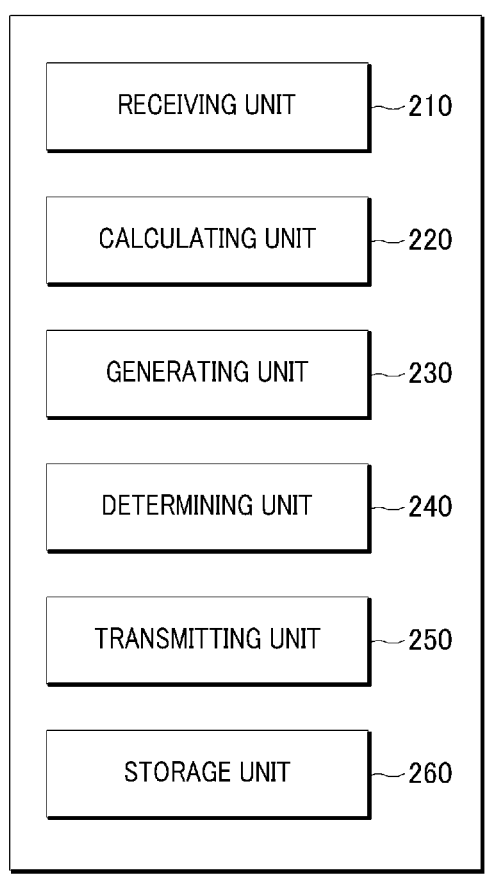

[Fig. 3]
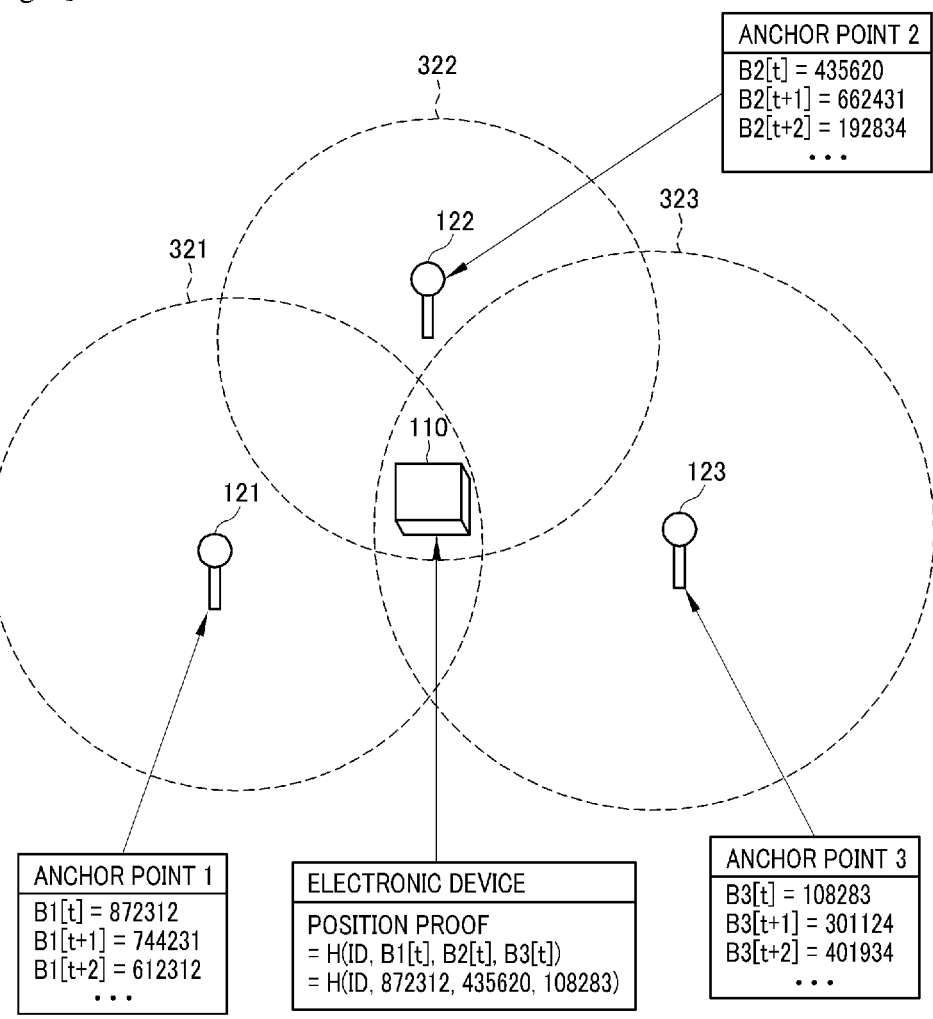

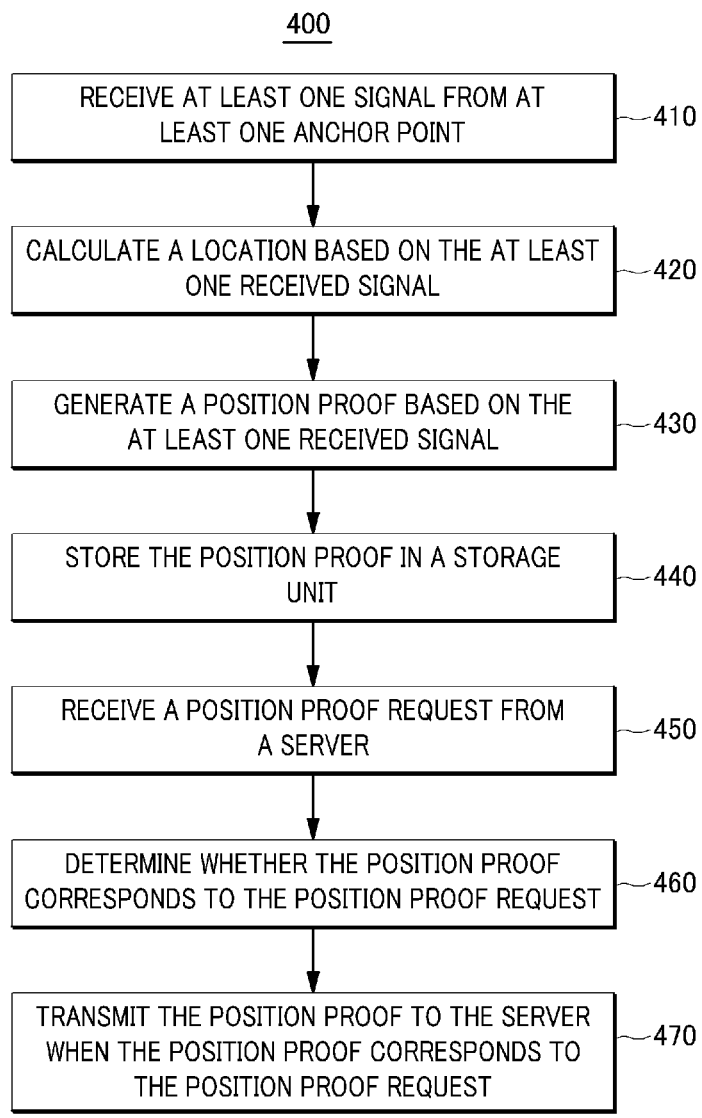

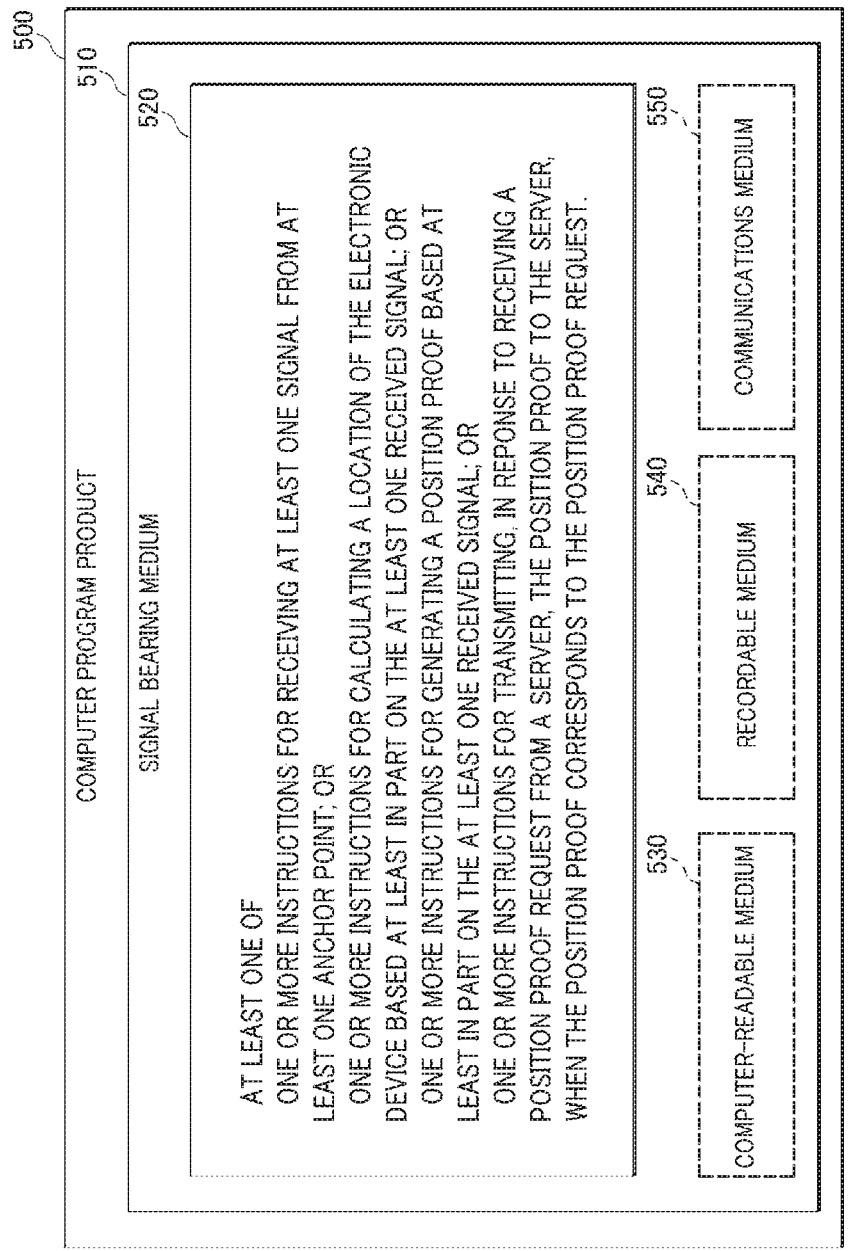

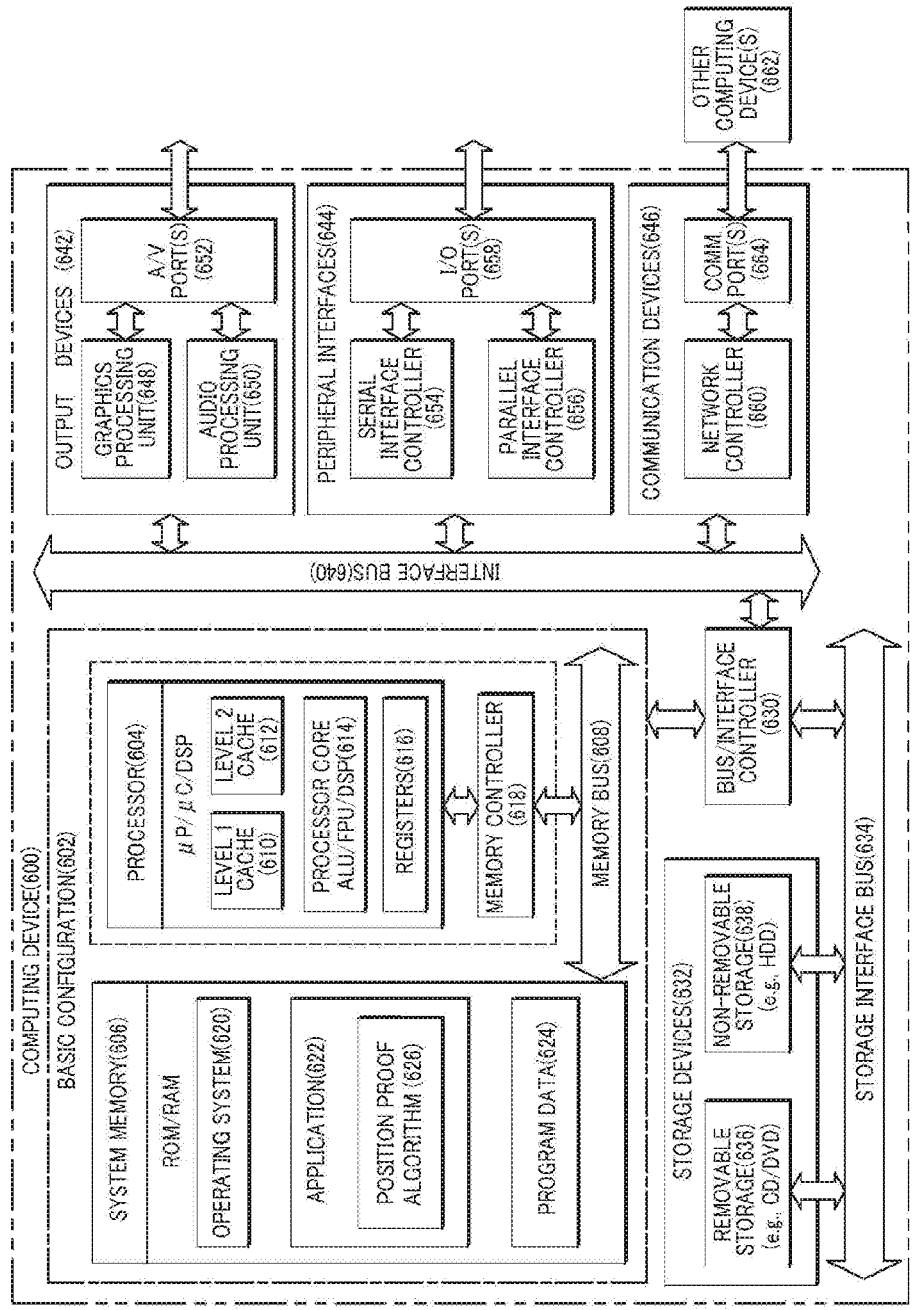
[Fig. 6]

POSITION AUTHENTICATION

CROSS-REFERENCE TO RELATED APPLICATION

This Application is the U.S. National Stage filing under 35 U.S.C. § 371 of International Application No. PCT/KR2014/003229, filed on Apr. 15, 2014.

BACKGROUND

The Internet of Things (IoT) refers to uniquely identifiable objects and their virtual representations in an Internet-like structure. Radio-frequency identification (RFID) was seen as a prerequisite for IoT devices in the early days. If all objects and people in daily life were equipped with identifiers, they could be managed and inventoried by computers. By using IoT devices, a person's ability to interact with objects can be altered remotely based on immediate or present needs.

SUMMARY

In an example, a method performed under control of an electronic device may include receiving at least one signal from at least one anchor point; calculating a location of the electronic device based at least in part on the at least one received signal; generating a position proof based at least in part on the at least one received signal; and in response to receiving a position proof request from a server, transmitting the position proof to the server, when the position proof corresponds to the position proof request.

In another example, an electronic device may include a receiving unit configured to receive at least one of at least one time-specific authentication value from at least one anchor point or a position proof request from a server; a calculating unit configured to calculate a location of the electronic device based at least in part on the at least one received time-specific authentication value; a generating unit configured to generate a position proof based at least in part on the at least one received time-specific authentication value; and a transmitting unit configured to transmit the position proof to the server, when the position proof corresponds to the position proof request.

In yet another example, a computer-readable storage medium may store thereon computer-executable instructions that, in response to execution, cause an electronic device to perform operations including receiving at least one signal from at least one anchor point; calculating a location of the electronic device based at least in part on the at least one received signal; generating a position proof based at least in part on the at least one received signal; and storing the position proof in a storage unit of the electronic device together with at least one of the calculated location or a time associated with the at least one signal.

In yet another example, a computer-readable storage medium may store thereon computer-executable instructions that, in response to execution, cause an IoT device to perform operations including scanning for authentication values; receiving authentication values from at least one anchor point; determining a relative position by triangulation relative to the at least one anchor point; generating a position proof by combining the received authentication values; and transmitting the position proof and values for a time and position corresponding to the position proof to a requesting server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 1 shows an illustrative example of a position authentication environment including an electronic device, multiple anchor points, a network and a server, arranged in accordance with at least some embodiments described herein;

FIG. 2 shows a block diagram illustrating an example architecture for an electronic device, arranged in accordance with at least some embodiments described herein;

FIG. 3 shows an illustrative example of generation of a position proof for an electronic device based on signals from multiple anchor points, arranged in accordance with at least some embodiments described herein;

FIG. 4 shows an example flow diagram of a process to implement a position authentication scheme, arranged in accordance with at least some embodiments described herein;

FIG. 5 shows illustrates computer program products that may be utilized to provide a position authentication scheme, arranged in accordance with at least some embodiments described herein; and FIG. 6 is a block diagram illustrating an example computing device that may be utilized to provide a position authentication scheme, arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a position authentication scheme. Technologies are generally described for schemes for authenticating a position of an electronic device using a position proof.

In some embodiments, each of one or more anchor points may be configured to generate a signal, which may include, for example, a time-specific authentication value such as, for example, a random number that is valid for a specific period of time. Further, the signal may include location information of corresponding anchor point. Each of the anchor points may be further configured to transmit the signal to a server and/or an electronic device, which may be located within its communication range. In some embodiments, upon receiving the signals from the anchor points, the electronic device may be configured to calculate a location of the electronic device and to generate a position proof based on the time-specific authentication values included in the received signals. By way of example, but not limitation, the electronic device may use triangulation to obtain the location of the electronic device. Further, the electronic device may generate the position proof by hashing a device ID of the electronic device and the time-specific authentication values included in the received signals. In some embodiments, the electronic device may be further configured to store, in its storage unit, the position proof together with the calculated location of the electronic device and/or a time associated with the received signals.

In some embodiments, the server may be configured to send a position proof request to the electronic device, and upon receiving the position proof request, the electronic device may be configured to determine whether the position proof stored in the storage unit corresponds to the position proof request from the server. By way of example, but not limitation, the position proof request may include designated location information and/or designated time information. The electronic device may determine whether the designated location information corresponds to the calculated location of the electronic device and/or the designated time information corresponds to the time associated to with the received signals by looking up the corresponding position proof stored in the storage unit. In some embodiments, the electronic device may be configured to transmit the position proof to the server based on the determination that the position proof corresponds to the position proof request.

In some embodiments, in response to receiving the position proof from the electronic device, the server may be configured to authenticate a position of the electronic device. By way of example, but not limitation, the server may determine whether the time-specific authentication values of the received position proof corresponds to the time-specific authentication values included in the signals received from the one or more anchor points to authenticate the position of the electronic device. Accordingly, the position authentication scheme described herein may guarantee that the electronic device may operate appropriately at its authenticated position.

FIG. 1 shows an illustrative example of a position authentication environment 100 including an electronic device 110, multiple anchor points 121, 122 and 123, a network 130 and a server 140, arranged in accordance with at least some embodiments described herein. Although FIG. 1 illustrates that three anchor points are located around electronic device 110, one skilled in the art will appreciate that any number of anchor points can be located around electronic device 110.

In some embodiments, electronic device 110 may be any type of IoT (Internet of Things) device including, but not limited to, a home appliance such as, for example, a television, a radio or a washing machine, a sensor such as a motion sensor, a light sensor, a temperature sensor or a pressure sensor, and a device for air conditioning, health care, ARM (Automatic Meter Reading) or a smart car.

In some embodiments, electronic device 110 may be configured to receive signals from anchor points 121, 122 and 123. By way of example, but not limitation, each of the signals may be broadcasted as a beacon signal from respective anchor points 121, 122 and 123, and electronic device 110, which may be located within communication ranges of anchor points 121, 122 and 123, may receive each signal from each of anchor points 121, 122 and 123. In some embodiments, each signal may include a time-specific authentication value such as, for example, a random number that is valid for a specific period of time. Further, in some embodiments, each signal may include location information of corresponding one of anchor points 121, 122 and 123.

In some embodiments, electronic device 110 may be configured to calculate a location of electronic device 110 based on the received signals. By way of example, but not limitation, electronic device 110 may be configured to calculate the location of electronic device 110 based on the location information included in each signal using any well-known location identification technologies such as, for example, triangulation.

In some embodiments, electronic device 110 may be configured to generate a position proof based on the received signals. By way of example, but not limitation, electronic device 110 may be configured to generate the position proof by hashing a device ID of electronic device 110 and each random number of each received signal. By way of another example, electronic device 110 may be configured to generate the position proof using any cryptographic functions. In some embodiments, electronic device 110 may be further configured to store the position proof in a storage unit of electronic device 110 together with at least one of the calculated location of electronic device 110 or a time associated with the received signals.

In some embodiments, electronic device 110 may be configured to receive a position proof request from server 140. By way of example, but not limitation, the position proof request may include at least one of designated location information or designated time information.

In some embodiments, electronic device 110 may be configured to determine whether the position proof corresponds to the position proof request from server 140. By way of example, but not limitation, electronic device 110 may be configured to determine whether the designated location information of the position proof request corresponds to the calculated location of electronic device 110 and/or whether the designated time information of the position proof request corresponds to the time associated with the received signals by looking up the corresponding position proof stored in the storage unit.

In some embodiments, electronic device 110 may be configured to transmit the position proof to server 140 based on the determination that the position proof corresponds to the position proof request from server 140. By way of example, but not limitation, electronic device 110 may be configured to transmit the position proof to server 140 based on the determination that the designated location information of the position proof request corresponds to the calculated location of electronic device 110 and/or that the designated time information of the position proof request corresponds to the time associated with the received signals.

In some embodiments, electronic device 110 and server 140 may be communicatively connected to each other via network 130. By way of example, but not limitation, the network may be implemented in accordance with any wireless network protocol such as, for example, the Internet, a satellite network, Bluetooth, WiBro (Wireless Broadband Internet) or the like.

In some embodiments, server 140 may be configured to receive the signals from anchor points 121, 122 and 123. By way of example, but not limitation, the signals may include a time-specific authentication value such as, for example, a random number that is valid for a specific period of time. In some embodiments, the signals may be transmitted from anchor points 121, 122 and 123 over a secured channel (not depicted in FIG. 1) in order to prevent eavesdropping by a third party.

In some embodiments, server 140 may be configured to generate a position proof request, which may include, for example, at least one of designated location information or designated time information. Further, server 140 may be configured to transmit the position proof request to electronic device 110.

In some embodiments, server 140 may be configured to receive a position proof from electronic device 110. By way of example, but not limitation, the position proof may be generated based on the signals from anchor points 121, 122 and 123, as described above, and each signal may include a time-specific authentication value such as, for example, a random number that is valid for a specific period of time. In some embodiments, server 140 may be configured to authenticate a position of electronic device 110 based on the received position proof. By way of example, but not limitation, server 140 may determine whether the random numbers in the position proof transmitted from electronic device 110 correspond to the random numbers in the signals received from anchor points 121, 122 and 123 to authenticate the position of electronic device 110.

In some embodiments, each of anchor points 121, 122 and 123 may be configured to generate a signal, which may include, for example, a time-specific authentication value such as, for example, a random number that is valid for a specific period of time. In some embodiments, each of anchor points 121, 122 and 123 may be configured transmit the signal to server 140 via a secured channel. Further, each of anchor points 121, 122 and 123 may be configured transmit the signal to electronic device 110, which may be located within a communication range of each of anchor points 121, 122 and 123.

By way of example, but not limitation, each of anchor points 121, 122 and 123 may include at least one of a GPS satellite, a mobile base station or a wireless access point. The granularity of position of electronic device 110 authenticated by the position proof may depend on an area of an intersection region established by communication ranges of anchor points, and thus, anchor points 121, 122 and 123 may be disposed with one or more smaller anchor points such as, for example, a small cell including, but not limited thereto, a pico-cell, a femto-cell or the like, so that the position of electronic device 110 authenticated by the position proof may have more increased granularity.

FIG. 2 shows a block diagram illustrating an example architecture for electronic device 110, arranged in accordance with at least some embodiments described herein. As depicted in FIG. 2, electronic device 110 may include a receiving unit 210, a calculating unit 220, a generating unit 230, a determining unit 240, a transmitting unit 250 and a storage unit 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 210, calculating unit 220, generating unit 230, determining unit 240, transmitting unit 250 and storage unit 260 may be included in an instance of an application hosted by electronic device 110. Further, reference may be made to the embodiments depicted and described with reference to FIG. 1.

Receiving unit 210 may be configured to receive signals from anchor points 121, 122 and 123. By way of example, but not limitation, when electronic device 110 is located within respective communication ranges of anchor points 121, 122 and 123, receiving unit 210 may receive the signals from anchor points 121, 122 and 123. By way of example, but not limitation, each of the signals may include a time-specific authentication value such as, for example, a random number that is valid for a specific period of time. Receiving unit 210 may be further configured to receive a position proof request from server 140. By way of example, but not limitation, the position proof request may include designated location information and/or designated time information.

Calculating unit 220 may be configured to calculate a location of electronic device 110 based on the received signals. In some embodiments, each of the received signals may include location information of corresponding one of anchor points 121, 122 and 123. Electronic device 110 may be configured to calculate the location of electronic device 110 based on the location information by, as a non-limiting example, using triangulation.

Generating unit 230 may be configured to generate a position proof based on the received signals. By way of example, but not limitation, electronic device 110 may be configured to generate the position proof by hashing a device ID of electronic device 110 and the time-specific authentication values of the received signals.

Determining unit 240 may be configured to determine whether the generated position proof corresponds to the position proof request received from server 140. By way of example, but not limitation, determining unit 240 may be configured to determine whether the designated location information of the position proof request corresponds to the calculated location of electronic device 110 and/or whether the designated time information of the position proof request corresponds to a time associated with the received signals by looking up the corresponding position proof stored in storage unit 260.

Transmitting unit 250 may be configured to transmit the position proof to server 140 based on the determination that the generated position proof corresponds to the position proof request from server 140. By way of example, but not limitation, electronic device 110 may be configured to transmit the position proof to server 140 based on the determination that the designated location information of the position proof request corresponds to the calculated location of electronic device 110 and/or that the designated time information of the position proof request corresponds to the time associated with the received signals.

Storage unit 260 may be configured to store the position proof generated by generating unit 230. By way of example, but not limitation, storage unit 260 may be configured to store the position proof together with the calculated location of electronic device 110 and/or the time associated with the received signals.

FIG. 3 shows an illustrative example of generation of a position proof for electronic device 110 based on signals from multiple anchor points 121, 122 and 123, arranged in accordance with at least some embodiments described herein. Although FIG. 3 illustrates that three anchor points are located around electronic device 110, one skilled in the art will appreciate that any number of anchor points can be located around electronic device 110. Reference may be made to the embodiments depicted and described with reference to FIGS. 1 and 2.

In some embodiments, each of anchor points 121, 122 and 123 may generate a signal, which may include, for example, a time-specific authentication value. By way of example, but not limitation, anchor points 121, 122 and 123 may generate respective authentication values $B_i[t]$ for a current time window t. After a specific period of time, anchor points 121, 122 and 123 may generate respective authentication values $B_i[t+1]$ for a next time window t+1. By way of example, but not limitation, each of the authentication values generated by anchor points 121, 122 and 123 may include a random number that is valid for the specific period of time.

As depicted in FIG. 3, anchor point 121 may generate a random number of 872312 for an authentication value $B_1[t]$, anchor point 122 may generate a random number of 435620 for an authentication value $B_2[t]$ and anchor point 123 may generate a random number of 108283 for an authentication value $B_3[t]$, respectively, for a current time window t. After the specific period time, anchor point 121 may generate a random number of 744231 for an authentication value $B_1[t+1]$, anchor point 122 may generate a random number of 662431 for an authentication value $B_2[t+1]$ and anchor point 123 may generate a random number of 301124 for an authentication value $B_3[t+1]$, respectively, for a next time window t+1. Further, after the specific period time, anchor point 121 may generate a random number of 612312 for an authentication value $B_1[t+2]$, anchor point 122 may generate a random number of 192834 for an authentication value $B_2[t+2]$ and anchor point 123 may generate a random number of 401934 for an authentication value $B_3[t+2]$, respectively, for another next time window t+2.

In some embodiments, each of anchor points 121, 122 and 123 may transmit the generated signal, which may include the corresponding authentication value to electronic device 110 located within a communication rage of each of anchor points 121, 122 and 123. By way of example, but not limitation, anchor points 121 may transmit the random number of 872312 for the authentication value $B_1[t]$, anchor points 122 may transmit the random number of 435620 for the authentication value $B_2[t]$ and anchor points 123 may transmit the random number of 108283 for the authentication value $B_3[t]$, respectively, for the current time window t to electronic device 110.

In some embodiments, in response to receiving the signals from anchor points 121, 122 and 123, electronic device 110 may generate a position proof based on the received signals. By way of example, but not limitation, the position proof may be generated by hashing a device ID of electronic device 110 and the random numbers of the received signals. As depicted in FIG. 3, electronic device 110 may hash the device ID of electronic device 110 and the random number of 872312 for the authentication value $B_1[t]$, the random number of 435620 for the authentication value $B_2[t]$ and the random number of 108283 for the authentication value $B_3[t]$ to generate the position proof for the current time window t.

FIG. 4 shows an example flow diagram of a process to implement a position authentication scheme, arranged in accordance with at least some embodiments described herein. The operations of process 400 may be implemented in position authentication environment 100 including electronic device 110, multiple anchor points 121, 122 and 123, network 130 and server 140, as illustrated in FIG. 1. Process 400 may include one or more operations, actions, or functions as illustrated by one or more blocks 410, 420, 430, 440, 450, 460 and/or 470. Although illustrated as discrete blocks, various blocks may be divided into additional blocks, combined into fewer blocks, or eliminated, depending on the desired implementation. Processing may begin at block 410.

At block 410 (Receive at least one Signal from at least one Anchor Point), an electronic device (such as, for example, receiving unit 210 of electronic device 110) may receive at least one signal from at least one anchor point (such as, for example, anchor points 121, 122 and 123). By way of example, but not limitation, electronic device 110 located within communication ranges of anchor points 121, 122 and 123 may receive, from anchor points 121, 122 and 123, respective signals, each of which may include a time-specific authentication value such as, for example, a random number that is valid for a specific period of time. Processing may proceed from block 410 to block 420.

At block 420 (Calculate a Location Based on the at least one Received Signal), the electronic device (such as, for example, calculating unit 220 of electronic device 110) may calculate a location of the electronic device based on the at least one received signal. By way of example, but not limitation, each signal may include location information of corresponding anchor point, and electronic device 110 may calculate the location of electronic device 110 using triangulation based on the location information. Processing may proceed from block 420 to block 430.

At block 430 (Generate a Position Proof Based on the at least one Received Signal), the electronic device (such as, for example, generating unit 230 of electronic device 110) may generate a position proof based on the at least one received signal. By way of example, but not limitation, electronic device 110 may generate the position proof by hashing a device ID of electronic device 110 and the random numbers of the received signals. Processing may proceed from block 430 to block 440.

At block 440 (Store the Position Proof in a Storage Unit), the electronic device (such as, for example, electronic device 110) may store the position proof in a storage unit (such as, for example, storage unit 260). By way of example, but not limitation, electronic device 110 may store the position proof in storage unit 260 together with the calculated location of electronic device 110 and/or a time associated with the received signals. Processing may proceed from block 440 to block 450.

At block 450 (Receive a Position Proof Request from a Server), the electronic device (such as, for example, receiving unit 210 of electronic device 110) may receive a position proof request from a server (such as, for example, server 140). By way of example, but not limitation, the position proof request may include at least one of designated location information or designated time information. Processing may proceed from block 450 to block 460.

At block 460 (Determine Whether the Position Proof Corresponds to the Position Proof Request), the electronic device (such as, for example, determining unit 240 of electronic device 110) may determine whether the generated position proof corresponds to the position proof request from the server (such as, for example, server 140). By way of example, but not limitation, electronic device 110 may determine whether the designated location information of the position proof request corresponds to the calculated location of electronic device 110 and/or whether the designated time information of the position proof request corresponds to the time associated with the received signals by looking up the corresponding position proof stored in storage unit 260. Processing may proceed from block 460 to block 470.

At block 470 (Transmit the Position Proof to the Server When the Position Proof Corresponds to the Position Proof Request), the electronic device (such as, for example, transmitting unit 250 of electronic device 110) may be configured to transmit the position proof to a server (such as, for example, server 140) based on the determination that the position proof corresponds to the position proof request from the server. By way of example, but not limitation, electronic device 110 may be configured to transmit the position proof to server 140 based on the determination that the designated location information of the position proof request corresponds to the calculated location of electronic device 110 and/or that the designated time information of the position proof request corresponds to the time associated with the received signals.

FIG. 5 illustrates computer program products that may be utilized to provide a position authentication scheme, arranged in accordance with at least some embodiments described herein. Program product 500 may include a signal bearing medium 510. Signal bearing medium 510 may include one or more instructions 520 that, when executed by, for example, an electronic device, may provide the functionality described above with respect to FIGS. 1-4. By way of example, but not limitation, instructions 520 may include: one or more instructions for receiving at least one signal from at least one anchor point; one or more instructions for calculating a location of the electronic device based at least in part on the at least one received signal; one or more instructions for generating a position proof based at least in part on the at least one received signal; one or more instructions for transmitting, in response to receiving a position proof request from a server, the position proof to the server, when the position proof corresponds to the position proof request. Thus, for example, referring to FIG. 4, electronic device 110 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc). Thus, for example, program product 500 may be conveyed to one or more modules of electronic device 110 by an RF signal bearing medium 520, where the signal bearing medium 520 is conveyed by a wireless communications medium 550 (e.g., a wireless communications medium conforming with the IEEE 802.11 standard).

FIG. 6 is a block diagram illustrating an example computing device that may be utilized to provide a position authentication scheme, arranged in accordance with at least some embodiments described herein. In these examples, elements of computing device 600 may be arranged or configured for an electronic device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc) or any combination thereof. System memory 606 may include an operating system 620, an application 622, and program data 624.

Application 622 may include a position proof algorithm 626 that may be arranged to perform the functions as described herein including the actions described with respect to an electronic device architecture as shown in FIG. 2 or including the actions described with respect to the flow charts shown in FIG. 4. Program data 624 may include any data that may be useful for providing the position authentication scheme as is described herein. In some embodiments, application 622 may be arranged to operate with program data 624 on an operating system 620 such that the scheme for authenticating a position of an electronic device as described herein may be provided.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc) or other peripheral devices (e.g., printer, scanner, etc) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc As a non-limiting example, each range discussed herein can be readily broken down into a lower third, middle third and upper third, etc As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an electronic device, the method comprising:
   receiving, by the electronic device, at least one signal from at least one anchor point, wherein the at least one signal includes a time-specific authentication value;
   calculating, by the electronic device, a location of the electronic device based at least, in part, on the received at least one signal;
   generating, by the electronic device, a position proof based at least, in part, on the time-specific authentication value included in the received at least one signal; and
   in response to receiving a position proof request from a server, transmitting, by the electronic device, the position proof to the server, when the position proof corresponds to the position proof request.

2. The method of claim 1, further comprising:
   storing the position proof in a storage unit of the electronic device.

3. The method of claim 2, wherein the storing includes storing, in the storage unit of the electronic device, the position proof together with at least one of the calculated location or a time associated with the received at least one signal.

4. The method of claim 3, wherein the transmitting further comprises transmitting, to the server, at least one of the calculated location or the time associated with the received at least one signal.

5. The method of claim 1, wherein the generating comprises generating a position proof request that includes at least one of designated location information or designated time information, and
   wherein the method further comprises:
   determining that the designated location information corresponds to the calculated location and/or that the designated time information corresponds to a time associated with the received at least one signal.

6. The method of claim 1, wherein the calculating comprises calculating the location of the electronic device based on triangulation.

7. The method of claim 1, wherein the receiving comprises receiving the at least one signal, each of which includes a random number that is valid for a specific period of time.

8. The method of claim 7, wherein the generating the position proof includes hashing a device ID of the electronic device and at least one random number of the received at least one signal.

9. The method of claim 7, wherein the generating the position proof is performed using a cryptographic function based on a device ID of the electronic device and at least one random number of the received at least one signal.

10. An electronic device, comprising:
    a receiver unit configured to:
    receive at least one time-specific authentication value from at least one anchor point, wherein the at least one time-specific authentication value includes a random number that is valid for a specific period of time; and
    receive a position proof request from a server;
    a calculator unit configured to calculate a location of the electronic device based at least, in part, on the received at least one time-specific authentication value;
    a generator unit configured to generate a position proof based at least, in part, on the received at least one time-specific authentication value; and
    a transmitter unit configured to transmit the position proof to the server, when the position proof corresponds to the position proof request.

11. The electronic device of claim 10, further comprising:
    a storage unit configured to store the position proof together with at least one of the calculated location or a time associated with the received at least one time-specific authentication value.

12. The electronic device of claim 10, wherein the position proof request includes at least one of designated location information or designated time information.

13. The electronic device of claim 12, further comprising:
    a determination unit configured to determine whether the designated location information corresponds to the calculated location and/or whether the designated time information corresponds to a time associated with the received at least one time-specific authentication value,
    wherein the transmitter unit is configured to transmit the position proof to the server, when the determination unit determines that the designated location information corresponds to the calculated location and/or that the designated time information corresponds to the time associated with the received at least one time-specific authentication value.

14. The electronic device of claim 10, wherein the calculator unit is configured to calculate the location of the electronic device based on triangulation.

15. The electronic device of claim 10, wherein the position proof includes at least one of the random number of the received at least one time-specific authentication value and a device ID of the electronic device.

16. The electronic device of claim 10, wherein the at least one anchor point includes at least one of a GPS satellite, a mobile base station, or a wireless access point.

17. A non-transitory computer-readable storage medium having stored thereon computer-executable instructions that, in response to execution, cause an electronic device to perform operations, comprising:
    receive, by the electronic device, at least one signal from at least one anchor point, wherein the at least one signal includes a time-specific authentication value;
    calculate, by the electronic device, a location of the electronic device based at least, in part, on the received at least one signal;
    generate, by the electronic device, a position proof based at least in part on the time-specific authentication value included in the received at least one signal; and
    store, by the electronic device, the position proof in a storage unit of the electronic device together with at least one of the calculated location or a time associated with the at least one signal.

18. The non-transitory computer-readable storage medium of claim 17, wherein the operations further comprise:
    receive, from a server, a position proof request that includes at least one of designated location information or designated time information;

determine that the designated location information corresponds to the calculated location and/or that the designated time information corresponds to the time associated with the at least one signal; and transmit the position proof to the server.

19. The non-transitory computer-readable storage medium of claim 17, wherein each of the at least one signal includes a random number that is valid for a specific period of time, and wherein the position proof includes at least one of random number of the received at least one signal and a device ID of the electronic device.

20. A non-transitory computer-readable storage medium having stored thereon computer-executable instructions that, in response to execution, cause an internet of things (IoT) device to perform operations, comprising:

scan for authentication values;

receive authentication values from at least one anchor point, wherein each authentication value includes a random number that is valid for a specific period of time;

determine a relative position by triangulation relative to the at least one anchor point;

generate a position proof by combining the received authentication values; and transmit the position proof and the received authentication values, for a time and a position corresponding to the position proof, to a requesting server.

* * * * *

UNITED STATES PATENT AND TRADEMARK OFFICE
CERTIFICATE OF CORRECTION

PATENT NO.        : 9,924,488 B2
APPLICATION NO.   : 14/890683
DATED             : March 20, 2018
INVENTOR(S)       : Lee Page 1 of 1

It is certified that error appears in the above-identified patent and that said Letters Patent is hereby corrected as shown below:

In the Claims

Column 14, Line 56, Claim 17, delete "least in part" and insert -- least, in part, --, therefor.

Column 15, Line 4, Claim 18, delete "the at" and insert -- the received at --, therefor.

Column 15, Line 17, Claim 20, delete "receive authentication" and insert -- receive the authentication --, therefor.

Signed and Sealed this
Twenty-sixth Day of June, 2018

Andrei Iancu
*Director of the United States Patent and Trademark Office*